UNITED STATES PATENT OFFICE 2,393,611

DIHYDRONORDICYCLOPENTADIENYL ETHERS OF NITRO ALCOHOLS

Herman A. Bruson, Philadelphia, Pa., assignor to The Resinous Products & Chemical Company, Philadelphia, Pa., a corporation of Delaware No Drawing. Application April 1, 1944, Serial No. 529,193

9 Claims. (Cl. 260—611)

This invention deals with new cyclic ethers derived from dicyclopentadiene by the acid-catalyzed addition thereto of nitro alcohols with simultaneous rearrangement to form ethers of hydroxydihydronordicyclopentadiene.

According to this invention, nitro alcohols are condensed in the presence of acidic condensing agents with dicyclopentadiene to form methers of hydroxydihydronordicyclopentadiene by an addition-rearrangement reaction as follows: (using 2-nitro-1-butanol as a typical nitro alcohol)

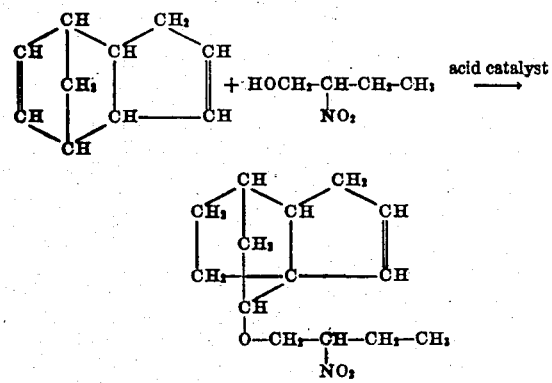

In place of 2-nitro-1-butanol there may be used other mono- or poly-hydroxy nitro compounds in which the nitro group or alcoholic hydroxyl group is primary, secondary, or tertiary. Both nitro and hydroxyl groups are aliphatically bound. The nitro alcohols include both straight-chained compounds and compounds containing cycles. Typical nitro alcohols which may be used are 2-nitro-1-butanol, 2-nitro-2-methyl-1-butanol, 2-nitro-2-methyl-1-propanol, 2-nitro-2-methyl-1-phenyl-1-propanol, 2-nitro-2-methyl-1-phenyl-1-butanol, 2-nitro-2-methyl-1,3-propanediol, 2-nitro-2-ethyl-1,3-propanediol, 3-nitro-3-methyl-2,4-pentanediol, trimethylol nitromethane, etc. In the case of the polyhydroxy nitro compounds, one or more of the alcoholic hydroxyl groups may be reacted to form an ether with the dihydronordicyclopentadienyl nucleus and suitable proportions of dicyclopentadiene may be taken to react with these hydroxyl groups.

Among the acidic condensing agents or catalysts which promote the above addition-rearrangement reaction between a nitro alcohol and dicyclopentadiene are boron trifluoride and its coordination complexes with oxygenated compounds, sulfuric acid and its acid esters such as ethyl acid sulfate, aromatic sulfonic acids such as toluene sulfonic acid, aliphatic sulfonic acids such as butyl sulfonic acid, strongly acidic salts such as zinc chloride, stannic chloride, titanium tetrachloride, antimonic chloride, ferric chloride, or aluminum chloride, and acidic siliceous clays such as those available under the trade names "Tonsil" or "Atapulgas."

Typical of the coordination complexes of boron trifluoride are those with ethers, such as $BF_3.C_2H_5OC_2H_5$ or $BF_3.C_4H_9OC_4H_9$; with carboxylic acids, which complexes may be exemplified by $BF_3.2CH_3COOH$ or $BF_3.C_3H_7—COOH$; with carboxylic esters, typified by $BF_3.2CH_3CH_2COOCH_3$ or $BF_3.2CH_3COOC_2H_5$; with ketones typified by $BF_3.CH_3COCH_3$; with alcohols, exemplified by $BF_3.2C_2H_5OH$ or $BF_3.2C_4H_9OC_4H_9$; with aldehydes, typified by $BF_3.CH_3CHO$; or with water, which complexes may be represented by $BF_3.(H_2O)_x$, $x$ being usually one or two.

The preferred catalysts are sulfuric acid and the boron trifluoride catalysts. It is surprising to note that, though even in traces such catalysts promote polymerization of monomeric cyclopentadiene to resins in the absence of alcohols, and also polymerize unsaturated ethers generally, they do neither to any appreciable extent in the case of a mixture of dicyclopentadiene and nitro alcohol. On the contrary, they promote the formation of new, highly reactive, and useful nitro ethers which have an unsaturated linkage by an addition-rearrangement reaction.

This reaction requires only a small amount of catalyst. In general, amounts of catalyst from 2% to 10% of the weight of the dicyclopentadiene are sufficient and satisfactory for the purposes of this invention, but both smaller and larger amounts are often effective and may be used.

The addition-rearrangement reaction may be initiated by mixing the dicyclopentadiene and nitro alcohol in the presence of an acidic condensing agent at temperatures as low as 0° C. in some cases, at room temperature, or at elevated temperatures. It is generally desirable to control the reaction at the start, since it is exothermal, by controlling the rate of mixing and the temperature by external cooling, if necessary, or by the use of a solvent or diluent, such as a hydrocarbon solvent, including petroleum naphthas, toluene, or similar hydrocarbon, or such as a chlorinated solvent, including carbon tetrachloride, ethylene dichloride, tetrachloroethane, and the like.

The reaction may be accelerated when desired or carried to completion more rapidly by continuing the reaction by warming the mixture up to 100° C. or more. Usually the optimum working range is 60° to 100° C.

After the reaction has been carried to the desired point, the acidic catalyst should be removed by washing. In the case of the monoethers, it is usually possible to distil the product under reduced pressure. Polyethers are not as a general rule amenable to such type of purification but may be treated with decolorizing agents such as charcoal, be stripped of solvent and unreacted reagents, or be extracted with solvents.

The following examples illustrate this invention, it being understood that the terms "dihydronordicyclopentadiene" or "dihydronordicyclopentadienyl" refer to the new polycyclic radical, $C_{10}H_{13}$—, represented by the following structural formula,

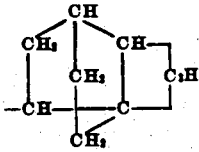

wherein $C_2H_4$ is an isopropenylene group which in conjunction with the adjoining carbon atoms forms a cyclopenteno ring, as one terminal cycle. As is evident, the nitro alcohol residue is attached through oxygen to a secondary carbon atom which is flanked by a methylene group and a tertiary carbon atom in an endoethylene cyclopentano group carrying the propenylene group which forms a cyclopenteno ring therewith.

This invention is illustrated by the following examples which present details of the preparation of typical products of this invention together with reference to typical properties thereof.

Example 1

A mixture of 119 g. of 2-nitro-2-methyl-propanol-1 and 132 g. of dicyclopentadiene was heated to 60° C. and stirred until a clear, homogeneous melt was obtained. To this melt there was added dropwise 30 g. of boron trifluoride-diethyl ether complex, $BF_3.C_2H_5OC_2H_5$, during a period of 45 minutes while the mixture was stirred and the reaction temperature maintained at 60°–65° C. by appropriate external cooling to control the strong exothermal reaction which occurred.

When the exothermal reaction had ceased, the mixture was heated at 70°–80° C. for one hour and was then poured into water. A dark oil separated and was washed with hot water several times to remove the boron trifluoride and any unchanged 2-nitro-2-methyl-propanol-1. The residual oil was dried in vacuo at 90° C. The yield was 192 g. Upon distillation in vacuo, the 2-nitro-2-methylpropoxy-dihydronordicyclopentadiene, having the probable formula:

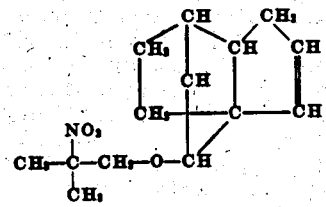

distilled at 155°–160° C./2 mm. as a colorless oil. Upon redistillation, it boiled at 152°–155° C/2 mm. and possessed the following constants: $N_D^{25}$ 1.4980; $d_4^{25}$ 1.093.

Example 2

A mixture of 119 g. of 2-nitro-1-butanol and 132 g. of dicyclopentadiene was heated to 60° C. and stirred while 20 g. of boron trifluoride-diethyl ether complex, $BF_3.C_2H_5OC_2H_5$, was added dropwise during the course of 20 minutes. The exothermal reaction which resulted was controlled by external cooling so that the temperature of the reaction mixture was held at 55°–60° C. throughout the addition period. The mixture was then held at 60° C. for five hours longer. It was thoroughly washed with hot water and dried at 90° C. under reduced pressure. The residual oil, weighing 208 grams, was then distilled in vacuo.

The product, 2-nitrobutoxy-dihydronordicyclopentadiene, distilled at 155°–160° C./2 mm. as a colorless oil in a yield of 127 grams. Upon redistillation, it boiled at 160° C./3 mm.

Example 3

A mixture consisting of 52.8 g. of pure dicyclopentadiene, 60 g. of 2-nitro-2-ethyl-propane-1,3-diol, and 2 g. of boron trifluoride-dibutyl ether complex, $BF_3.C_4H_9OC_4H_9$, was stirred at 50°–60° C. and gradually warmed to 80° C. After the mixture had been stirred for four hours at 80° C., the product was cooled, washed with dilute soda solution, then with water, and dried in vacuo. The residual oil, amounting to 90 grams, was distilled in vacuo.

The dihydronordicyclopentadienyl monoether of 2-nitro-2-ethyl-propane-1,3-diol

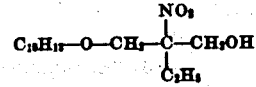

distilled over at 175°–180° C./2.5 mm. as a pale yellow oil in a yield of 40 grams. Upon redistillation, the pure compound boiled at 160°–170° C./2 mm.

By repeating this preparation with 105 g. of dicyclopentadiene there is obtained a red residual oil containing two ether groups which boils at too high a temperature to be conveniently distilled even at low pressures.

The compounds are of value for the preparation of drugs and insecticides. The new ethers may be reduced both at the nitro group to form amines and hydroxylamines by known methods involving hydrogen, sulfides, hydrosulfites, and the like, and at the olefinic linkage of the cyclopenteno group to yield saturated ethers. Furthermore, the new nitro ethers may be reacted at the olefinic linkage with halogens and thiocyanic acid.

The products of this invention have the general formula

wherein $C_{10}H_{13}$ is the dihydronordicyclopentadienyl nucleus, $n$ is a small integer, such as 1, 2, or 3, and R is an organic residue to which the indicated nitro group is aliphatically bound or is joined at an aliphatic carbon atom.

This application is a continuation-in-part of my copending application Serial No. 476,640, filed February 20, 1943.

I claim:

1. An acid-catalyzed addition-rearrangement product of an alcohol having an aliphatically bound nitro group and dicyclopentadiene, said product being a dihydronordicyclopentadienyl ether of said nitro alcohol, in which the nitro alcohol residue is attached through oxygen to a secondary carbon atom which is flanked by a methylene group and a tertiary carbon atom in an endoethylene cyclopentano group carrying a propenylene group which forms a cyclopenteno ring therewith.

2. An acid-catalyzed addition rearrangement product of an aliphatic nitro alcohol and dicyclopentadiene, said product being a dihydronordicyclopentadienyl ether of said aliphatic nitro alcohol, in which the nitro alcohol residue is attached through oxygen to a secondary carbon atom which is flanked by a methylene group and a tertiary carbon atom in an endoethylene cyclopentano group carrying a propenylene group which forms a cyclopenteno ring therewith.

3. An acid-catalyzed addition-rearrangement product of an arylaliphatic nitro alcohol in which the nitro group is aliphatically bound and dicyclopentadiene, said product being a dihydronordicyclopentadienyl ether of said arylaliphatic nitro alcohol, in which the nitro alcohol residue is attached through oxygen to a secondary carbon atom which is flanked by a methylene group and a tertiary carbon atom in an endoethylene cyclopentano group carrying a propenylene group which forms a cyclopenteno ring therewith.

4. An acid-catalyzed addition-rearrangement product of 2-nitro-2-methyl-propanol-1 and dicyclopentadiene, said product being a dihydronordicyclopentadienyl ether of 2-nitro-2-methyl-propanol-1, in which the 2-nitro-2-methyl propyl group is attached through oxygen to a secondary carbon atom which is flanked by a methylene group and a tertiary carbon atom in an endoethylene cyclopentano group carrying a propenylene group which forms a cyclopenteno ring therewith.

5. An acid-catalyzed addition-rearrangement product of 2-nitro-1-butanol and dicyclopentadiene, said product being a dihydronordicyclopentadienyl ether of 2-nitro-1-butanol, in which the 2-nitro-butyl group is attached through oxygen to a secondary carbon atom which is flanked by a methylene group and a tertiary carbon atom in an endoethylene cyclopentano group carrying a propenylene group which forms a cyclopenteno group therewith.

6. A method for preparing an addition-rearrangement product of dicyclopentadiene and a nitro alcohol, said product being a dihydronordicyclopentadienyl ether of said nitro alcohol, which comprises reacting by bringing together between about 0° C. and about 100° C. dicyclopentadiene and a nitro alcohol in the presence of an acidic condensing agent.

7. A method for preparing an addition-rearrangement product of dicyclopentadiene and 2-nitro-2-methyl-propanol-1, said product being a dihydronordicyclopentadienyl ether of said 2-nitro-2-methyl-propanol-1, which comprises reacting by bringing together between about 0° C. and about 100° C. dicyclopentadiene and 2-nitro-2-methyl propanol-1 in the presence of an acidic condensing agent.

8. A method for preparing an addition-rearrangement product of dicyclopentadiene and 2-nitro-1-butanol, said product being a dihydronordicyclopentadienyl ether of said 2-nitro-1-butanol, which comprises reacting by bringing together between about 0° C. and about 100° C. dicyclopentadiene and 2-nitro-1-butanol in the presence of an acidic condensing agent.

9. A method for preparing an addition-rearrangement product of dicyclopentadiene and a nitro alcohol, said product being a dihydronordicyclopentadienyl ether of said nitro alcohol, which comprises reacting by bringing together between about 0° C. and about 100° C. dicyclopentadiene and a nitro alcohol in the presence of a boron trifluoride catalyst.

HERMAN A. BRUSON.